United States Patent [19]
Cook et al.

[11] Patent Number: 5,974,331
[45] Date of Patent: Oct. 26, 1999

[54] METHOD AND SYSTEM FOR DYNAMICALLY ASSIGNING FEATURES AND USERS TO WIRELINE INTERFACES

[75] Inventors: Charles I. Cook, Louisville; James R. Corliss, Thornton; Michael J. Fargano, Louisville; Angus O. Dougherty, Westminter, all of Colo.

[73] Assignee: U S West, Inc., Denver, Colo.

[21] Appl. No.: 08/826,615

[22] Filed: Apr. 4, 1997

[51] Int. Cl.⁶ .............................. H04Q 7/00; H04Q 9/00
[52] U.S. Cl. ........................ 455/461; 455/414; 379/201
[58] Field of Search .................................. 455/461, 435, 455/463, 31.3, 518, 519, 520, 526, 403, 417, 414, 31.1, 517; 379/201, 207, 208

[56] References Cited

U.S. PATENT DOCUMENTS

| | | |
|---|---|---|
| 4,833,701 | 5/1989 | Comroe et al. . |
| 5,168,575 | 12/1992 | Cizek et al. ............................. 455/514 |
| 5,353,331 | 10/1994 | Emery et al. . |
| 5,371,898 | 12/1994 | Grube et al. . |
| 5,475,735 | 12/1995 | Williams et al. ........................ 455/417 |
| 5,526,397 | 6/1996 | Lohman ..................................... 379/58 |
| 5,590,176 | 12/1996 | Aragwal et al. ........................ 455/560 |
| 5,703,881 | 12/1997 | Kay et al. . |

Primary Examiner—Reinhard J. Eisenzopf
Assistant Examiner—Edan Orgad
Attorney, Agent, or Firm—Brooks & Kushman

[57] ABSTRACT

A method and system for supporting wireless and/or wireline features of telecommunications subscribers utilizing existing wireline interfaces includes a processor for provisioning the wireline interfaces to support predetermined wireless and/or wireline features. A service logic, such as a Service Control Point (SCP), assigns the wireline interfaces to the telecommunications subscribers on a call-by-call basis based on the features subscribed to by the subscriber. The processor is further operative to reprovision the wireline interfaces based on the number of subscribers assigned to the wireline interfaces.

16 Claims, 8 Drawing Sheets

Fig. 7

METHOD AND SYSTEM FOR DYNAMICALLY ASSIGNING FEATURES AND USERS TO WIRELINE INTERFACES

TECHNICAL FIELD

This invention relates to methods and systems for dynamically assigning features to interfaces of a wireline network and methods and systems for assigning customers to the interfaces on a call-by-call basis.

BACKGROUND ART

As the demand for wireless communications services increases, both wireless and wireline service providers alike continue to seek ways to supply such services to satisfy the needs of their existing and potential customers. These service providers normally accomplish this task by adding new hardware and software to allow increased usage in existing networks and to expand such networks to new coverage areas. For wireline service providers, however, the task is far more complicated. Because wireline service providers generally do not have existing wireless networks, substantial time and expense must be incurred to set up the required infrastructure. This infrastructure includes, for example, Mobile Switching Centers (MSCs) which, unlike conventional wireline switches, have the ability to assign features such as three-way calling and call forwarding on a call-by-call basis. This capability is necessary due to the nature of wireless communications wherein it is inherent that one or more of the call participants have mobility.

As a partial solution to this problem, wireline service providers have utilized what is known in the art as one-to-one mapping. In this approach, a maximum number of subscribers are each assigned a resource at a switch located at the wireline network that accommodates the features subscribed to by the subscriber. When a subscriber is not utilizing his/her line, their corresponding switch resource remains idle. Furthermore, a fixed number of transport facilities between the two networks are shared by a fixed number of subscribers. Thus, the system is limited to a fixed number of subscribers, and blocking occurs when the number of subscribers trying to make a call exceeds the number of transport facilities. For example, in a GR-303 application the maximum number of subscribers may be 2048. Each of these 2048 subscribers are then assigned a specific switch resource at the wireline network. If there are only 96 transport facilities, then blocking would occur when the 97th subscriber attempts to make a call at the same time that 96 subscribers are already engaged in a conversation.

As readily seen, the above approach, while an advance over the prior art, still has limitations since sharing of resources is limited to a fixed maximum number of subscribers sharing a fixed number of transport facilities.

Consequently, a need exists for an integrated wireline/wireless network which has the capability to provide wireless and/or wireline services using existing switching infrastructure, but which is not limited by the above-noted drawbacks of one-to-one mapping. Such a system should utilize a single switching platform so as to afford the service provider the opportunity to offer feature portability between wireline and wireless access to communications services, as well as offer a common user interface.

DISCLOSURE OF THE INVENTION

It is a general object of the present invention to offer wireline features to wireless subscribers.

It is another object of the present invention to provide integrated wireless/wireline telecommunications services utilizing a wireline switch rather than a mobile switching center (MSC).

It is yet another object of the present invention to pool wireline interfaces into feature groups that represent the combinations of services and network features subscribed to by telecommunications customers.

It is a further object of the present invention to dynamically assign lines on a call-by-call basis to wireline interfaces in the feature group that corresponds to the subscriber profile and the line being assigned.

It is yet another object of the present invention to adjust the pool sizes utilizing static or dynamic thresholds.

Still further, it is an object of the present invention to dynamically assign a mobile user to a specific wireline interface based on the features subscribed to by the mobile user and the available resources.

In carrying out the above objects and other objects, features, and advantages of the present invention, a method is provided for using existing wireline interfaces to support wireless and/or wireline features of telecommunications subscribers. The method includes the step of provisioning the wireline interfaces to support predetermined wireless or wireline features. The method also includes the step of assigning the wireline interfaces to the telecommunications subscribers on a call-by-call basis based on the features subscribed to by the subscriber. Finally, the method includes the step of reprovisioning the wireline interfaces based on the number of customers assigned to the wireline interfaces.

In further carrying out the above objects and other objects, features, and advantages of the present invention, a system is also provided for carrying out the steps of the above described method. The system includes a processor operative to provision the wireline interfaces to support predetermined wireless or wireline features. The system also includes service logic operative to assign the wireline interfaces to the telecommunications subscribers on a call-by-call basis based on the features subscribed to by the subscriber. The processor is further operative to reprovision the wireline interfaces based on the number of customers assigned to the wireline interfaces.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
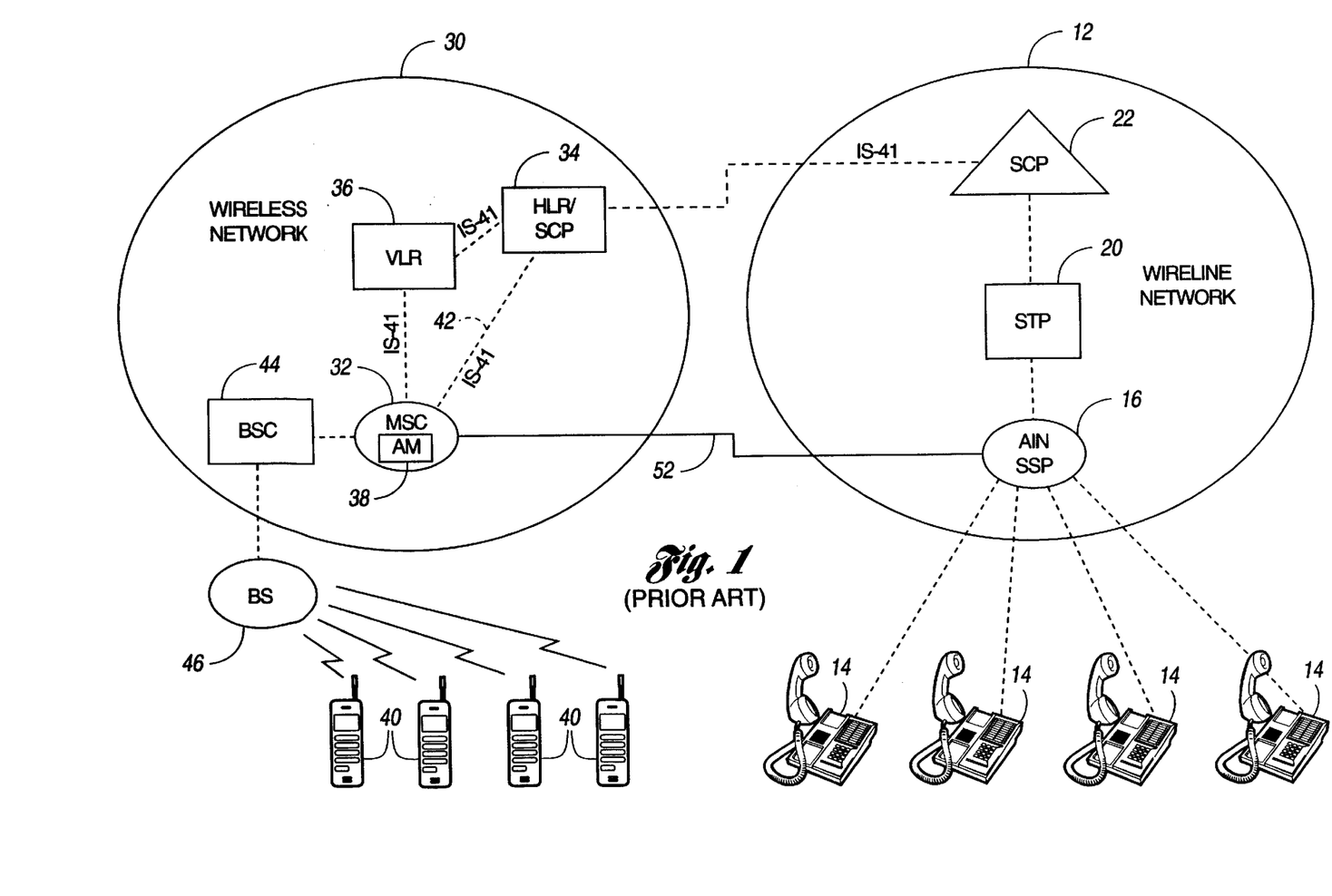
FIG. 1 is a schematic diagram of a typical prior art wireless network system architecture.

A schematic diagram of the system architecture of a typical prior art wireless network is shown in FIG. 1. The system architecture includes a wireline network 12 typically consisting of a number of switches and application processors interconnected by transmission circuits to serve a plurality of wireline telephones 14. Common Channel Signaling, such as Signaling System No. 7 (SS7), is a signaling method in which a signaling channel conveys, by means of labeled messages, signaling information relating to call setup, control, network management, and network maintenance. The SS7 network exists within wireline network 12 and controls it. SS7 achieves this control by creating and transferring call processing, network management and maintenance messages to the network's various components.

An SS7 network has three distinct components, Service Switching Points (SSPs) 16, Signal Transfer Points (STPs) 20, and Service Control Points (SCPs) 22. SSP 16 performs call processing on calls that originate, tandem, or terminate at that site. As part of this call processing, SSP 16 may generate SS7 messages to transfer call-related information to other SSPs, or to send a query to SCP 22 for instructions on how to route a call.

STP 20 is a switch that relays messages between network switches and databases. The main function of STP 20 is to route SS7 messages to the correct outgoing signaling link, based on information contained in the SS7 message address fields. SCP 22 contains centralized network databases for providing enhanced services. The SCP 22 accepts queries from an SSP 16 and returns the requested information to the originator of the query.

The wireless network 30 typically includes a Mobile Switching Center (MSC) 32 for processing calls to and from the wireless users of the wireless network 30. MSC 32 is known to those skilled in the art as a digital telephone exchange which controls the switching between the wireline network 12 and mobile cell sites for all wireline-to-mobile, mobile-to-wireline, and mobile-to-mobile calls. In operation, when MSC 32 receives a call from the wireline network 12 which is directed to a wireless handset 40, MSC 32 deciphers the telephone number dialed by the originating caller and alerts Base Station Controllers (BSCs) 44 (described below) at all cell sites to page the corresponding wireless handset 40. Similarly, when wireless handset 40 places a call, MSC 32 accepts the dialing data from BSC 44 and dials the desired number for transmission to wireline network 12. MSC 32 also processes mobile registration status data received from BSC 44, switches calls to other cells, processes diagnostic information, and compiles mobile billing statistics.

Typical wireless networks include several coverage areas each including multiple adjoining cells. The BSC 44, which operates under the direction of MSC 32, serves each coverage area via a plurality of Base Stations (BSs) 46 disposed throughout each of the adjoining cells. The BSC 44 manages each of the radio channels assigned to its coverage area, supervises calls, turns the radio transceivers on and off, injects data onto control and user channels, and performs diagnostic tests on the cell site equipment.

The MSC 32 is the functional equivalent to the SSP 16 of the wireline network 12. MSC 32 retrieves all necessary data to respond to subscriber call requests from three databases—the Home Location Register (HLR)/SCP 34, the Visitor Location Register (VLR) 36, and the Access Manager (AM) 38—each discussed more fully herein.

To register a subscriber in the wireless network 30, MSC 32 ascertains whether a subscriber is present in the wireless network when the subscriber places a call via wireless handset 40, receives a call via wireless handset 40, or by automatic registration. Specifically, each time wireless handset 40 is powered on or a call is originated from wireless handset 40, certain information is transmitted to MSC 32, including the Mobile Identification Number (MIN), Electronic Serial Number (ESN) and System Identification (SID) of the wireless handset 40.

The HLR/SCP 34 is a master database for storing data related to each mobile subscriber, such as the subscriber profile and mobility information together with their relevant permanent (static) data, such as access capabilities and subscriber services. In addition, HLR/SCP 34 is in electrical communication with and provides MSC 32 with information about the MSC 32 service area where the wireless handset 40 is actually located (temporary or dynamic data) to allow incoming calls to be routed immediately to the called subscriber's wireless handset 40. Although HLR/SCP 34 and wireline SCP 22 are shown as separate components, they could be integrated into a single component.

The VLR 36 is a temporary database containing detailed data on location and service data regarding each subscriber entering its coverage area for routing which is used for incoming and outgoing calls. VLR 36 is in electrical communication with MSC 32 and HLR 34 so that MSC 32 may set up incoming and outgoing calls. VLR 36 is a dynamic subscriber database, exchanging considerable amounts of data with its related HLR 34. Data stored in VLR 36 follows subscribers when they enter another VLR area.

The AM 38 manages the mobility functionality of the wireless portion of the system architecture. The AM 38 accesses the HLR/SCP 34 when a subscriber registers in the network in order to authenticate the users. Together with BSC 44, HLR/SCP 34, and VLR 36, AM 38 provides radio functionality such as registration, authentication, and call hand off between base stations 46. AM 38 may also contain the functionality for translating between the Pulse Code Modulated (PCM) voice coding of the wireline network and wireless voice coding.

Generally, SSP 16 is connected to MSC 32 by trunk circuits 52, while wireless components such as MSC 32, HLR/SCP 34, VLR 36 and AM 38 are connected with each other by IS-41 Mobile Application Part (MAP) protocols operating over SS7 or X.25 networks. In some implementations, MSC 32, VLR 36, AM 38, and HLR/SCP 34 may be integrated into one component. IS-41 data trunks are packet switched networks, having either X.25 or SS7 type transport options. HLR/SCP 34 is also connected to the wireline SCP 22 via IS-41 for transferring data between the wireline network 12 and the wireless network 30.

Figure 2:
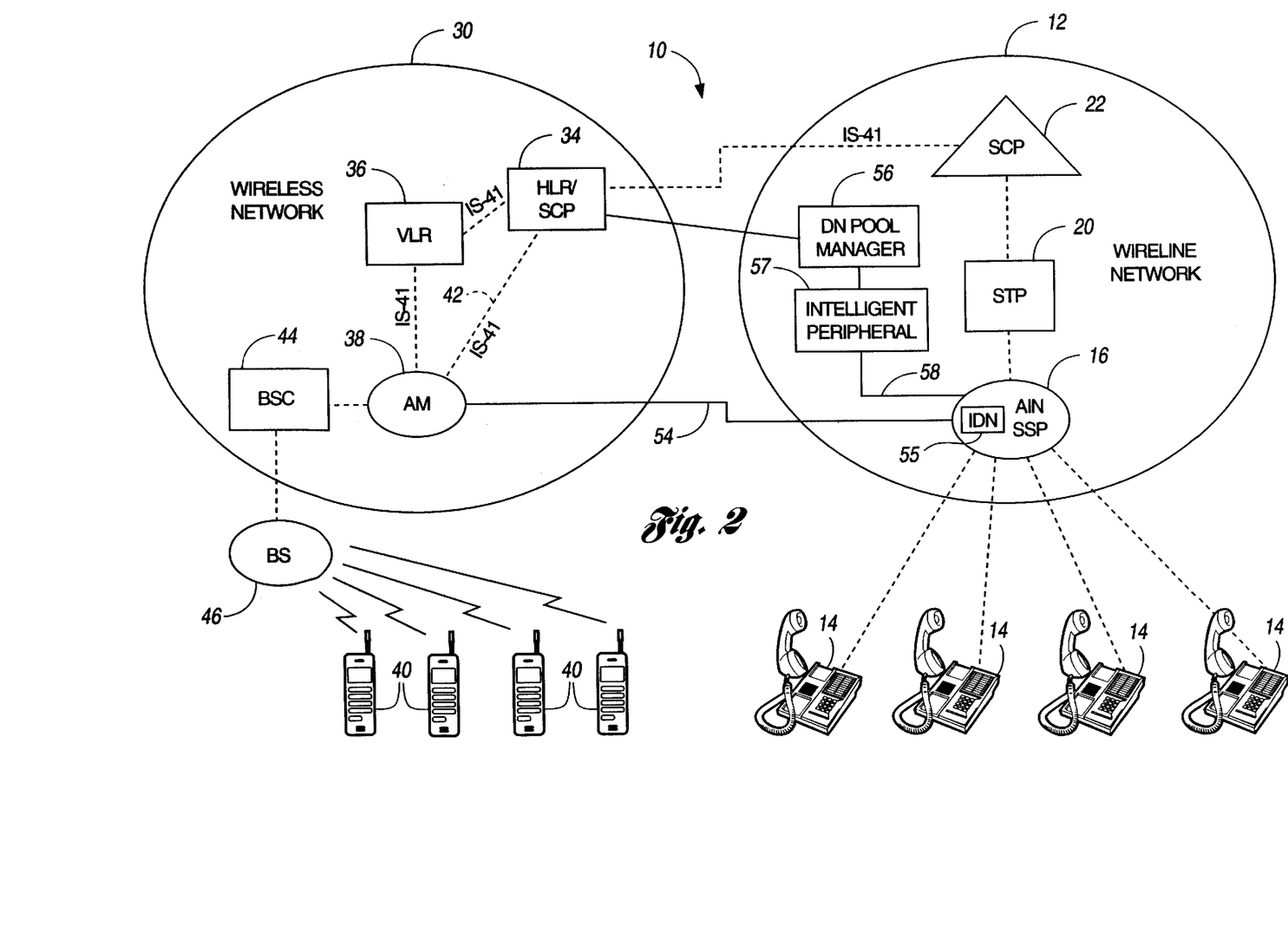
FIG. 2 is a schematic diagram of the system architecture of the present invention.

Turning now to FIG. 2, there is shown a schematic diagram of the system architecture of the present invention. The system, denoted generally by reference numeral 10, is similar to that of the architecture shown in FIG. 1, however, the switching fabric of MSC 32 has been eliminated. The common components between the system 10 of the present invention and the system of FIG. 1 are illustrated using the same reference numbers as in FIG. 1. The functionality of switching fabric of MSC 32 has been reduced to that of AM 38. AM 38 is now logically connected to at least one Interface Directory Number (IDN) 55 of SSP 16 by any one or more transport facilities 54 that support line-side features including, but not limited to, GR-303, GR-008, Copper Pairs, V5.2, ISDN BRI, etc.

The system architecture 10 of the present invention further includes a Directory Number (DN) Pool Manager 56 in electrical communication with HLR/SCP 34 and wireline SSP 16. DN Pool Manager 56 is connected to a typical Intelligent Peripheral (IP) 57 that includes service logic for performing provisioning operations. IP 57 is connected to SSP 16 via a typical operations interface 58 that supports provisioning. Although shown separate from DN Pool Manager 56, IP 57 may alternatively be integrated with DN Pool Manager 56. Also, DN Pool Manager 56 can reside in wireless network 30 rather than reside in wireline network 12, as shown in FIG. 2. Furthermore, DN Pool Manager 56 could also be integrated with HLR/SCP 34, VLR 36 or AM 38.

Figure 3:
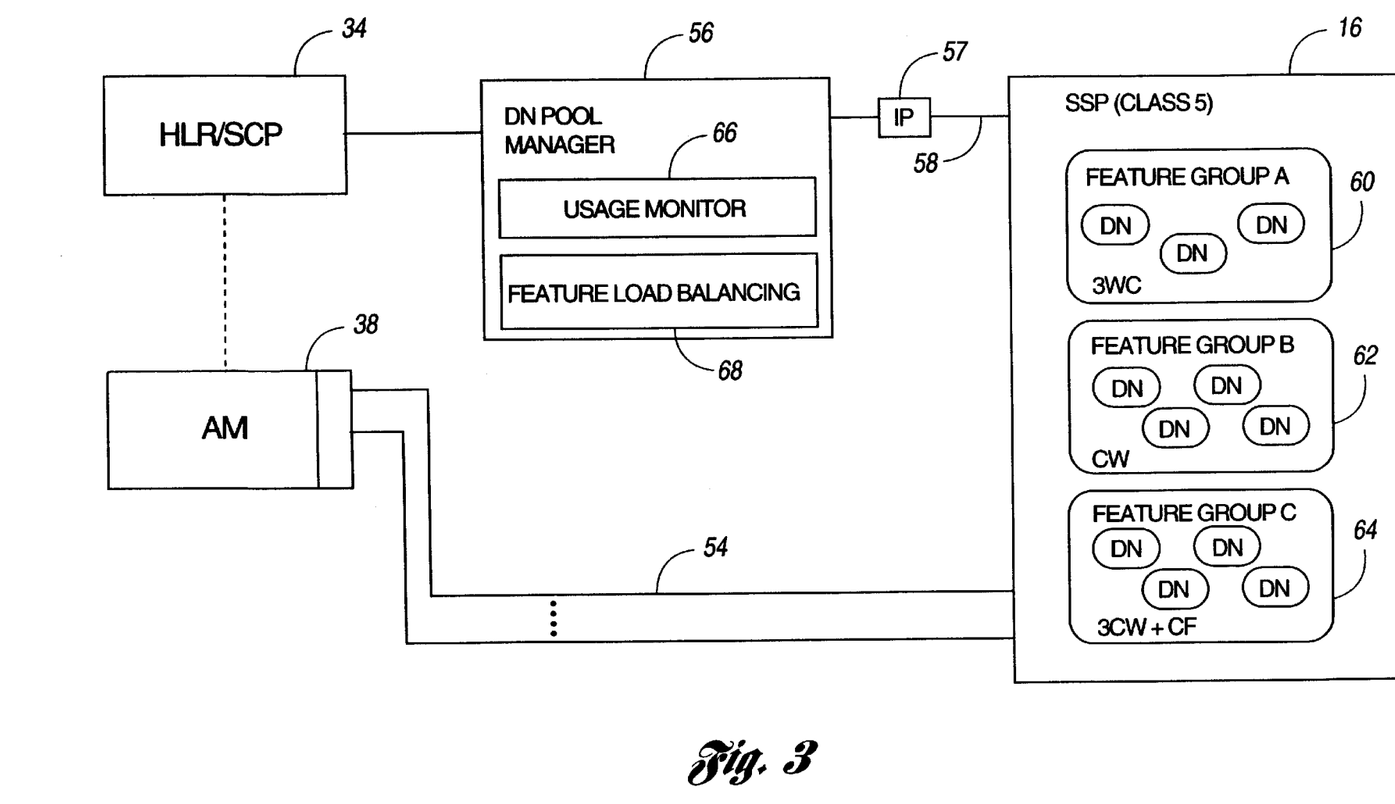
FIG. 3 is a block diagram illustrating the DN Pool Manager of the present invention as shown in FIG. 1.

FIG. 3 illustrates the DN Pool Manager 56 in more detail. DN Pool Manager 56 is a processor or algorithm that pools and manages Directory Numbers (DNs) as well as controls the provisioning of the IDNs 55 based on the pools of DNs. DNs correspond to the dialable numbers utilized to reach customers, and they identify all of the features subscribed to by the customer. In a single number service, in which a single number is assigned to a customer's wireline telephone as well as their wireless mobile telephone, the DN corresponds to the telephone number assigned to the customer. Consequently, the wireless mobile telephone must be mapped to the DN. This is accomplished by including a table in the DN Pool Manager 56 that maps the MIN of the mobile handset to the DN of the wireline telephone. In some cases, the MIN may be the same as the DN. The MIN and the DN are then mapped to one of the feature groups as described below identifying the features and services subscribed to by the customer of the wireless handset and the wireline telephone. In a non-single number service, the DN corresponds to the MIN of the wireless handset. In this case, the MIN is mapped to one of the feature groups.

DNs are pooled into feature groups that represent the combinations of services and network features (e.g., AIN triggers) subscribed to by the customers. For example, Feature Group A 60 includes DNs having three-way calling (3WC), Feature Group B 62 includes DNs having call waiting (CW), and Feature Group C 64 includes DNs having both 3WC and call forwarding (CF). Other feature groups can also be identified and formed, such as the user being able to transfer between his/her wireless and wireline telephones, and the user being able to call the other of the wireless or wireline telephone in a single number service application. Once the feature groups are identified and formed, each of the IDNs 55 are then provisioned to support one of the feature groups based on the number of feature groups and the number of DNs pooled into each of the feature groups. That is, the more DNs pooled into any one particular feature group, the more IDNs 55 are typically provisioned to support those corresponding features. Thus, pooling is utilized because the operations interfaces 58 used to configure wireline switches are unable to assign features on a call-by-call basis fast enough to satisfy call setup timing requirements.

To facilitate sufficient anticipation, each pool is assigned one or more static or dynamic thresholds. When the number of lines assigned to a particular pool exceeds or falls below a maximum or minimum threshold, respectively, as identified by a Usage Monitor 66, DN Pool Manager 56 reconfigures the pool sizes through the operations interface 58 based on available resources as identified by Feature Load Balancing 68. That is, DN Pool Manager 56 sends a command via operations interface 58 to wireline switch SSP 16, which then automatically re-provisions the IDNs 55 prior to actually needing the additional resource. Thus, re-provisioning occurs on a non-real time basis in anticipation of exceeding the available resources for each feature group. Input to pool sizing may thus be controlled by many parameters, such as time of day, traffic patterns, and anticipated traffic patterns.

Once the DNs are pooled into feature groups, a customer can then be mapped or assigned to a specific IDN 55 on a call-by-call basis based on the features subscribed to by the customer and the available resources.

Operation

Dynamic Provisioning of Wireline Interfaces

Figure 4:
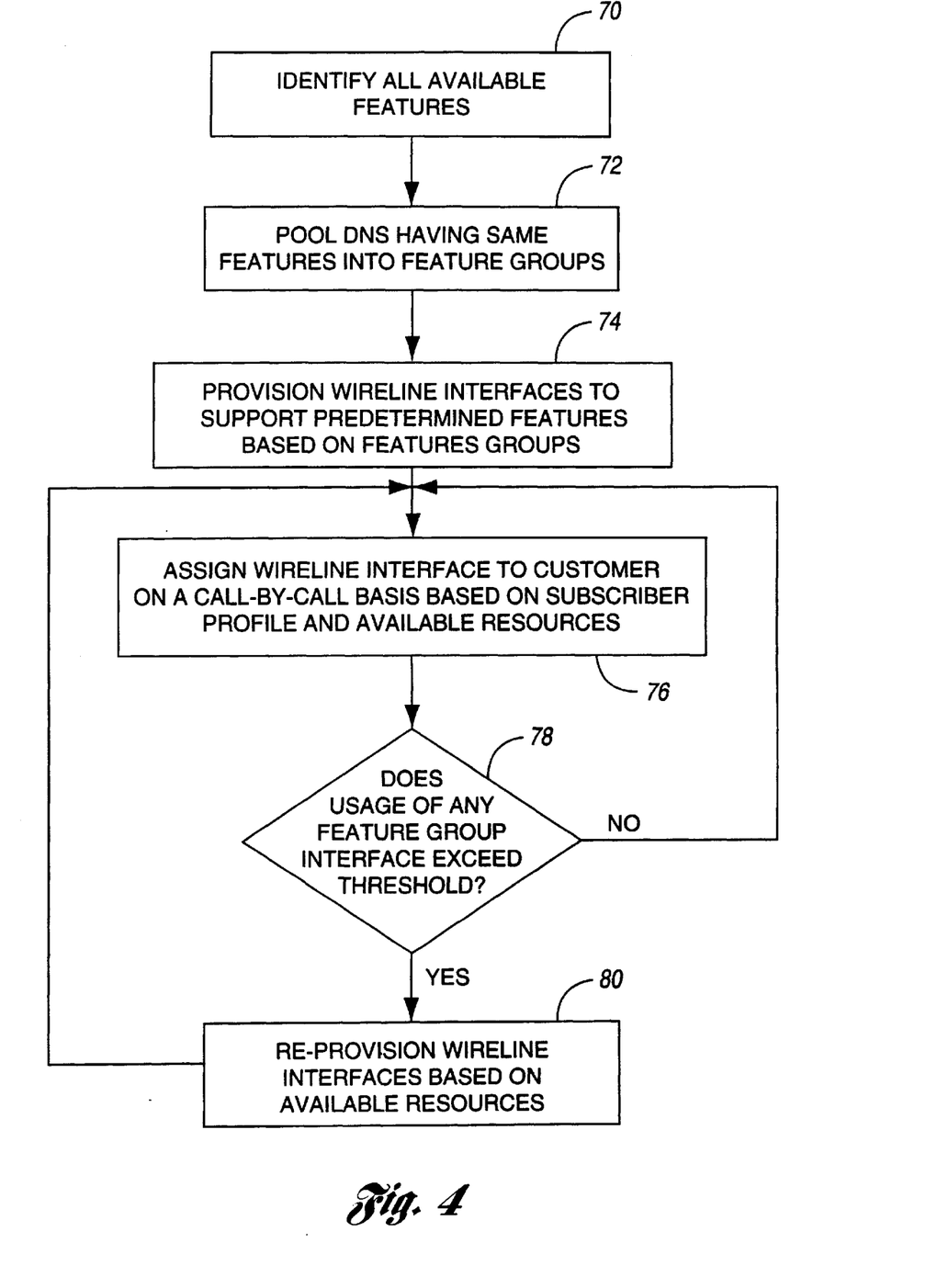
FIG. 4 is a flow diagram illustrating the general sequence of steps associated with the operation of dynamically provisioning wireline interfaces based on is pooled feature groups.

Turning now to FIG. 4, there is shown a flow diagram illustrating the general sequence of steps associated with dynamically provisioning wireline interfaces based on the pools of feature groups. Beginning at block 70, all available features are identified, such as 3WC, CW, CF, 3WC+CW, CW+CF, etc. Next, the DNs having the same features are pooled into corresponding feature groups, as shown at block 72.

The wireline interfaces, IDNs 55, are provisioned to support the predetermined features based on the feature groups, as shown at block 74. For example, 20 lines may be provisioned to support Feature Group A 60, while 30 lines may be provisioned to support Feature Group B 62. Of the lines provisioned for each feature group, a specific IDN 55 is assigned to a customer on a call-by-call basis based on the customer's subscriber profile and the available lines provisioned to support the features subscribed to by the customer, as shown at block 76. This step is described in more detail below in conjunction with FIGS. 5 and 6.

At the same time, DN Pool Manager 56 monitors the usage of the IDNs 55 to determine if the capacity of the pooled lines may be exceeded or underutilized according to any number of thresholds, as shown at conditional block 78. If the usage is not exceeded or underutilized, the IDNs 55 continue to be assigned on a call-by-call basis. If the usage is exceeded or underutilized, or anticipated to be exceeded or underutilized, DN Pool Manager 56 instructs IP 57 to re-provision the wireline IDNs 55 based on the available resources, as shown at block 80.

Mobile Originated Call

Figure 5:
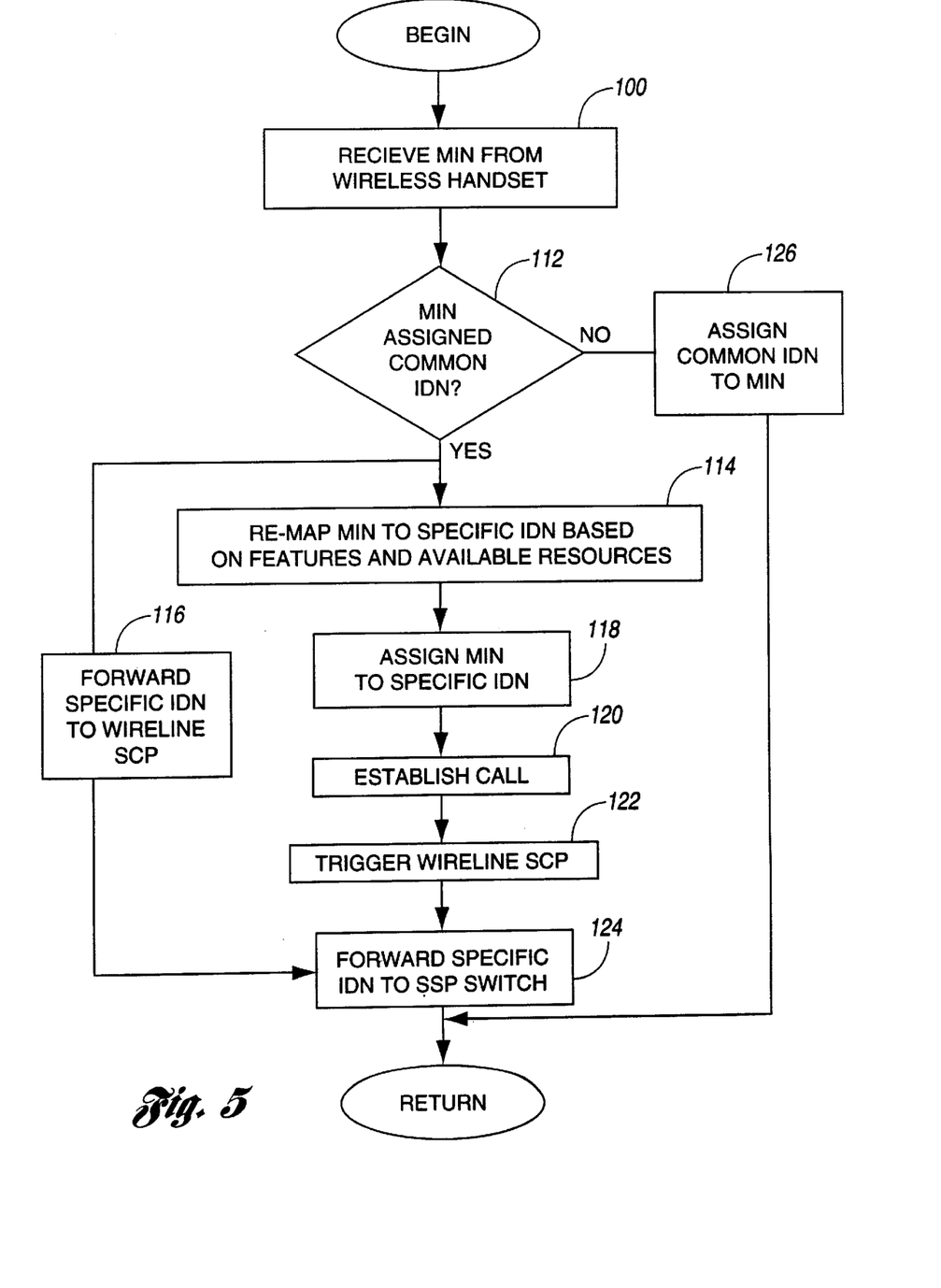
FIG. 5 is a flow diagram illustrating the general sequence of steps associated with the operation of the present invention in response to a mobile originated call.

FIG. 5 is a flow diagram illustrating the general sequence of steps associated with the operation of assigning a specific IDN 55 in response to a mobile originated call. Initially, the MIN of wireless handset 40 is transmitted and received by AM 38, as shown at block 100. Wireless handset 40 transmits its MIN on two occasions, upon registering in the wireless network 30 and upon originating a call. When wireless handset 40 first registers on the wireless network 30, AM 38 sends the MIN of wireless handset 40 to HLR/SCP 34. HLR/SCP 34 maps the MIN to a Common IDN 55 and returns the Common IDN 55 to AM 38. The Common IDN 55 is a common IDN 55, either a physical or software implemented line, utilized as a "waiting area" until a specific IDN 55 is assigned to the MIN. AM 38 uses this information to assign the MIN to the Common IDN 54. The specific algorithms identifying the sequence of messages to and from AM 38 can vary depending upon the structure and function of AM 38.

Upon receiving the MIN, a comparison is made to determine if the MIN is assigned a Common IDN 55, as shown at conditional block 112. If the MIN was assigned to a Common IDN 55, HLR/SCP 34 determines that the MIN was received in response to a call origination. On call origination, AM 38 sees that the IDN 55 that the MIN is assigned is Common, and performs a re-registration process with HLR/SCP 34. The re-registration process causes AM 38 to send the MIN to HLR/SCP 34. AM 38 is configured to perform a re-registration process in response to one of the following: 1) Mobile Call Origination; 2) Call release; and 3) On demand via message from HLR/SCP 34.

In response to the call origination, HLR/SCP 34 re-maps the MIN to an available resource based on the features subscribed to by wireless handset 40, as shown at block 114, and returns the specific IDN 55 associated with that resource to AM 38. Simultaneously, HLR/SCP 34 forwards the specific IDN 55 to wireline SCP 22 via IS-41 protocol, as shown at block 116.

AM 38 uses this information to assign the MIN to the specific IDN 55, as shown at block 118. The call is then established on the wireline switch 16, as shown at block 120. The establishment of the call causes a trigger to be sent to wireline SCP 22, as shown at block 122. At block 124, the specific IDN 55 is forwarded to the wireline switch SSP 16 from the wireline SCP 22. This allows information to be correlated between the wireless and wireline networks to facilitate billing.

Returning to conditional block 112, if the MIN was not assigned the Common IDN 55, HLR/SCP 34 determines that the MIN was received in response to a call release. When a call is released, AM 38 again performs a re-registration, which causes AM 38 to send the MIN to HLR/SCP 34. In response to the call release, HLR/SCP 34 maps the MIN to the Common IDN 55 and returns the Common IDN 55 to AM 38 so that AM 38 can assign the MIN to the Common IDN 55, as shown at block 126.

In a single number service application, service can be determined to operate in one of several ways: 1) Ring the wireless handset 40 first before trying to ring the wireline telephone 14; 2) Ring the wireline telephone 14 first before trying to ring the wireless handset 40; or 3) ringing both telephones at the same time and establishing a call with the telephone first to pick up the call. Assuming the single number service applications operates in the first way described above, if after trying to establish the call at block 12 and a busy signal is obtained, HLR/SCP 34 would then assign the MIN to the wireline interface permanently provisioned to the corresponding wireline telephone 14.

Wireline Originated Call

Figure 6A:
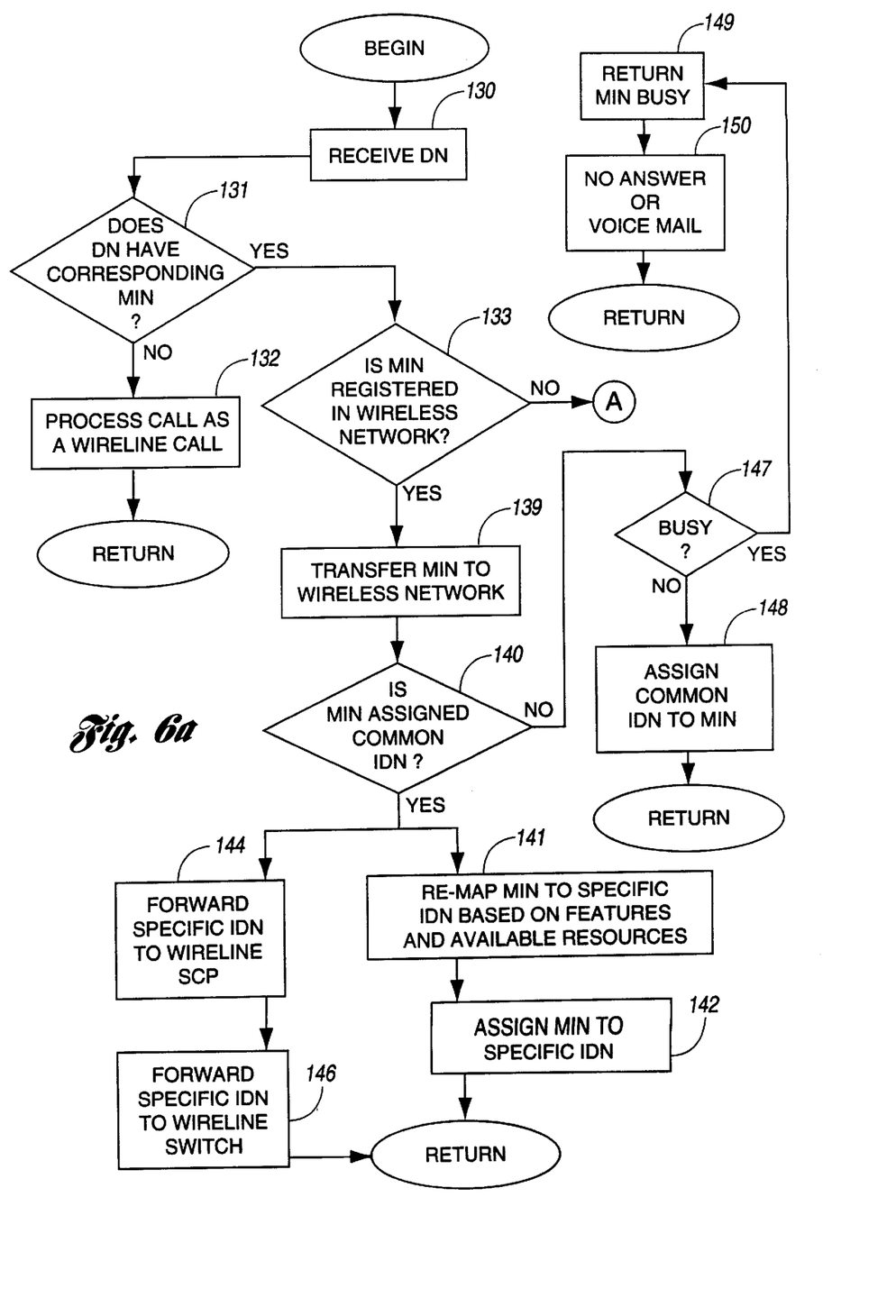
FIGS. 6a and 6b are flow diagrams illustrating the general sequence of steps associated with the operation of the present invention in response to a wireline originated call.
Figure 6B:
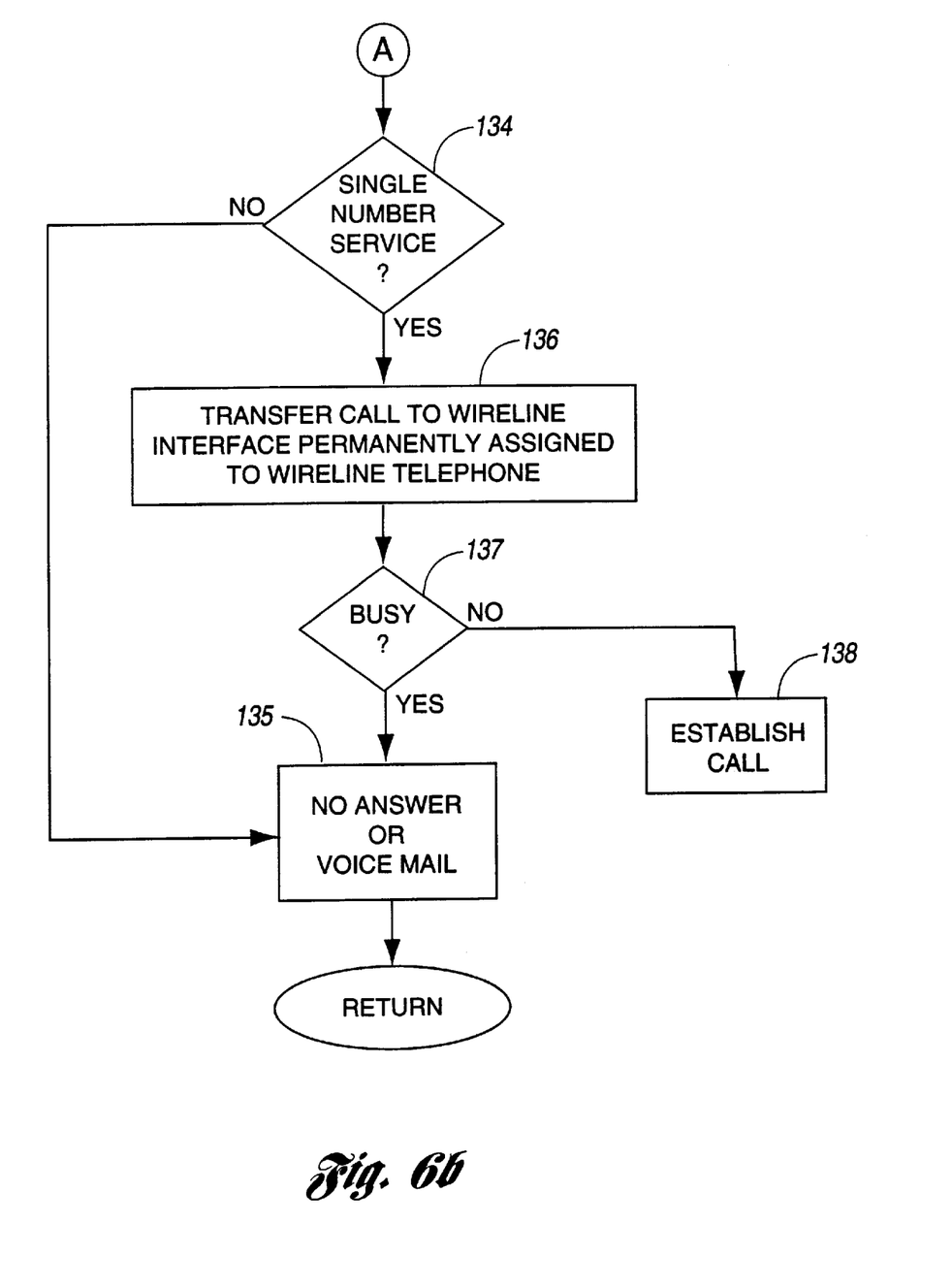

Turning now to FIGS. 6a and 6b, the general sequence of steps associated with the operation of assigning a wireline interface in response to a wireline originated call is illustrated. Upon receiving a call from wireline telephone 14 to a wireless handset 40, the DN of the customer to be reached is received by wireline SCP 22, as shown at block 130.

A determination is then made as to whether or not the DN has a corresponding MIN identifying it with a mobile handset 40, as shown at conditional block 131. If not, the call is processed as a normal wireline call, as shown at block 132.

If there is a MIN associated with the DN, another determination is made as to whether or not the MIN is registered in the wireless network 30, as shown at block 133. As discussed above, when wireless handset 40 first registers in the wireless network 30, AM 38 sends the MIN of wireless handset 40 to HLR/SCP 34. HLR/SCP 34 then maps the MIN to a Common IDN 55 and returns the Common IDN 55 to AM 38.

If the MIN is not registered in the wireless network 30, steps are performed based on whether or not the customer (or called party) is a customer of a single number service application, as shown at conditional block 134. If the customer is not a subscriber of single number service, then the wireless handset 40 is the only telephone available to the customer. Thus, if the MIN is not registered in the wireless network and the customer is not a subscriber of single number service, the caller is either transferred to voice mail or there is no answer, depending on the features/services subscribed to by the customer, as shown at block 135.

If the customer is a subscriber of single number service, the call is transferred to the wireline interface permanently provisioned to the wireline telephone 14, as shown at block 136. If the line is not busy, the call is established, as shown at conditional block 137 and block 138. Otherwise the call is transferred to voice mail or there is no answer, as shown at block 135.

Returning now to conditional block 133, if the MIN is registered in wireless network 30, wireline SCP 22 transfers the MIN to wireless network 30 via HLR/SCP 34, as shown at block 139. Preferably, HLR/SCP 34 would then automatically compare the MIN to a database to determine if the MIN was assigned the Common IDN 55, as shown at conditional block 140. Alternatively, if AM 38 cannot support re-registration independently, HLR/SCP 34 would transfer the MIN to AM 38 so that AM 38 can re-register the MIN. The re-registration causes AM 38 to re-send the MIN back to HLR/SCP 34.

If the MIN was assigned the Common IDN 55, the wireless handset 40 is available to be re-assigned to an available resource to take the call. HLR/SCP 34 re-maps the MIN to an available resource based on the features subscribed to by wireless handset 40, as shown at block 141, and returns the specific IDN 55 associated with that resource to AM 38 which then assigns the MIN to the specific IDN 55, as shown at block 142.

Simultaneously, HLR/SCP 34 forwards the specific IDN 55 to wireline SCP 22 via IS-41, as shown at block 144. Wireline SCP 22 returns the specific IDN 55 associated with the call to the wireline switch SSP 16 so that the call can be established, as shown at block 146. This allows information to be correlated between the wireless and wireline networks to facilitate billing and ensure that both the wireline network 12 and the wireless network 30 have assigned the call to the same resource.

Returning to conditional block 140, if the MIN was not assigned the Common IDN 55, HLR/SCP 34 determines that the MIN was received in response to either a call release or because the mobile handset 40 is busy on another call, as shown at conditional block 147. When a call is released, AM 38 again performs a re-registration, which causes AM 38 to send the MIN to HLR/SCP 34. In response to the call release, HLR/SCP 34 maps the MIN to the Common IDN 55 and returns the Common IDN 55 to AM 38 so that AM 38 can assign the MIN to the Common IDN 55, as shown at block 148.

If the mobile handset 40 is busy on another call, HLR/SCP 34 returns a "MIN Busy" signal to AM 38, as shown at block 149. As described above, the caller is then transferred to voice mail or there is no answer, depending on the features/services subscribed to by the customer, as shown at block 150.

Figure 7:
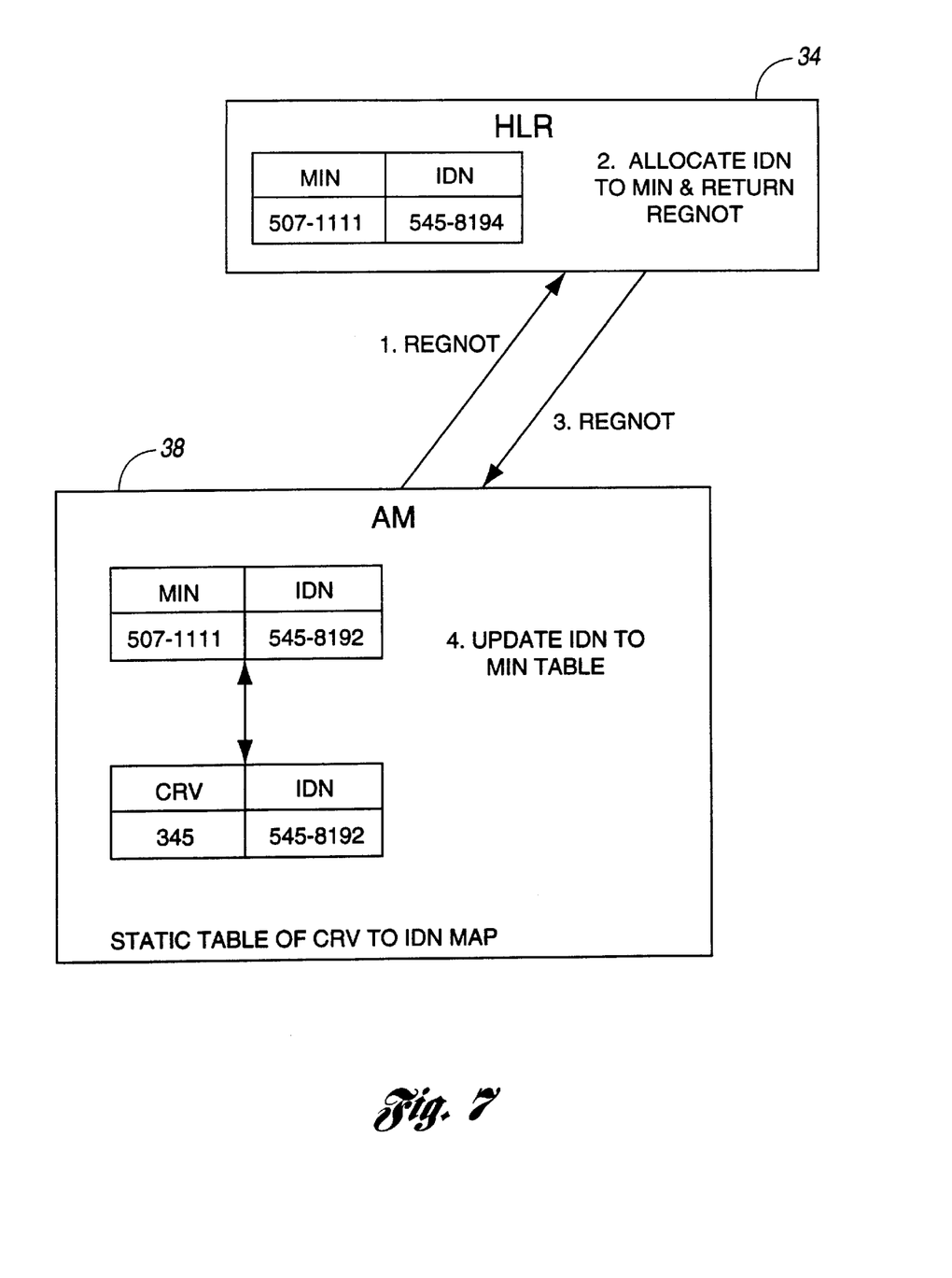
FIG. 7 is a diagram illustrating operation of the present invention utilizing a GR-303 interface.

The operation of the present invention may be further illustrated by way of an example utilizing a GR-303 interface as the transport facility 54. Each IDN 55 allocated in the SSP switch 16 corresponds to a specific logical line termination on the AM 38 side of the link. These logical line terminations are identified by Call Reference Values (CRV)

as defined in GR-NWT-000303. The mapping between an IDN 55 provisioned on the SSP 16 and a CRV provisioned on the AM 38 remain static, and is changeable only through the provisioning process.

The allocation of a CRV to a wireless handset 40 for call origination and termination is determined at the time of handset registration and is updated through re-registrations performed between AM 38 and HLR/SCP 34 via appropriate message exchanges. Alternatively, the same algorithms or mechanisms detailed above could be used to make the system more dynamic and increase resource utilization. For example, when an IS-41 Registration Notification Invoke message is sent from AM 38 to HLR/SCP 34, HLR/SCP 34 returns an appropriate IDN 55 in the Registration Notification Return Result, as shown in FIG. 7. The AM 38 then maintains a table of handset MINs to IDNs which is updated on each registration event. The table forms a one to one (and possibly a many to one) relation with the table of IDN to CRV mappings. Other appropriate message exchanges could, of course, be used depending on the specific architecture implemented and available network resources.

Although the present invention has been described in conjunction with IS-41 communication protocol, the teachings of the present invention could also be configured utilizing other communication protocols, such as MMAP (Mobility Management Access Protocol) Phase 1 and MMAP Phase 2. Furthermore, the present invention also applies to a fixed Wireless Local Loop (WLL) application in which the subscriber receives wireline services rather than wireless services via a radio link.

While the best modes for carrying out the invention have been described in detail, those familiar with the art to which this invention relates will recognize various alternative designs and embodiments for practicing the invention as defined by the following claims.

What is claimed is:

1. For use in an integrated wireline/wireless network, a method for using a fixed number of existing wireline interfaces to support a plurality of predetermined wireless and/or wireline features subscribed to by telecommunications subscribers, the method comprising:

provisioning each of the wireline interfaces to support one of the plurality of predetermined wireless and/or wireline features;

assigning each of the wireline interfaces to the telecommunications subscribers on a call-by-call basis based on the features subscribed to by each of the subscribers; and dynamically reprovisioning any one of the wireline interfaces on a call-by-call basis to support a different one of the plurality of pre-determined features based on the number of subscribers currently assigned to each of the wireline interfaces and the corresponding features subscribed to by each of the subscribers.

2. The method as recited in claim 1 wherein each of the telecommunications subscribers has a directory number assigned thereto for identifying the telecommunications subscriber and for identifying the wireless and/or wireline features subscribed to by the telecommunications subscriber, and wherein provisioning the wireline interfaces further includes:

pooling each of the directory numbers subscribing to the same features into a corresponding feature group to form a plurality of feature groups; and provisioning the wireline interfaces into a plurality of interface groups based on the plurality of feature groups so that each interface group supports one of the plurality of predetermined features.

3. The method as recited in claim 2 wherein assigning each of the wireline interfaces includes:

determining the directory number of the subscriber; and determining an unassigned wireline interface from one of the plurality of groups supporting the features subscribed to by the telecommunications subscriber.

4. The method as recited in claim 3 wherein each of the telecommunications subscribers further has a Mobile Identification Number (MIN) assigned thereto and wherein assigning the wireline interfaces includes determining the directory number based on the MIN.

5. The method as recited in claim 2 wherein dynamically reprovisioning includes comparing the number of telecommunications subscribers assigned to the wireline interfaces in each of the plurality of groups with a threshold.

6. The method as recited in claim 5 wherein comparing includes comparing the number of telecommunications subscribers assigned to each of the plurality of groups with a predetermined maximum threshold.

7. The method as recited in claim 5 wherein comparing includes comparing the number of telecommunications subscribers assigned to each of the plurality of groups with a predetermined minimum threshold.

8. The method as recited in claim 5 wherein comparing includes comparing the number of telecommunications subscribers assigned to each of the plurality of groups with a varying threshold.

9. For use in an integrated wireline/wireless network, a system for using a fixed number of existing wireline interfaces to support a plurality of predetermined wireless and/or wireline features subscribed to by telecommunications subscribers, the system comprising:

a processor operative to provision each of the wireline interfaces to support one of the plurality of predetermined wireless and/or wireline features;

service logic operative to assign each of the wireline interfaces to the telecommunications subscribers on a call-by-call basis based on the features subscribed to by each of the subscribers; and wherein the processor is further operative to dynamically reprovision the wireline interfaces on a call-by-call basis to support a different one of the plurality of predetermined features based on the number of subscribers currently assigned to each of the wireline interfaces and the corresponding features subscribed to by each of the subscribers.

10. The system as recited in claim 9 wherein each of the wireless subscribers has a directory number assigned thereto for identifying the subscriber and for identifying the wireless and/or wireline features subscribed to by the telecommunications subscriber, and wherein the processor, in provisioning the wireline interfaces, is further operative to pool each of the directory numbers subscribing to the same features into a corresponding feature group to form a plurality of feature groups and to provision the wireline interfaces into a plurality of interface groups based on the plurality of feature groups so that each interface group supports one of the plurality of predetermined features.

11. The system as recited in claim 10 wherein the service logic, in assigning each of the wireline interfaces, is further operative to determine the directory number of the telecommunications subscriber and determine an unassigned wireline interface from one of the plurality of groups supporting the features subscribed to by the telecommunications subscriber.

12. The system as recited in claim 11 wherein each of the telecommunications subscribers further has a Mobile Identification Number (MIN) assigned thereto and wherein the service logic, in assigning the wireline interfaces, is further operative to determine the directory number based on the MIN.

13. The system as recited in claim 10 wherein the control logic, in dynamically reprovisioning the wireline interfaces, is further operative to compare the number of telecommunications subscribers assigned to the wireline interfaces in each of the plurality of groups with a threshold.

14. The system as recited in claim 13 wherein the control logic, in comparing the number, is further operative to compare the number of telecommunications subscribers assigned to each of the plurality of groups with a predetermined maximum threshold.

15. The system as recited in claim 13 wherein the control logic, in comparing the number, is further operative to compare the number of telecommunications subscribers assigned to each of the plurality of groups with a predetermined minimum threshold.

16. The system as recited in claim 13 wherein the control logic, in comparing the number, is further operative to compare the number of telecommunications subscribers assigned to each of the plurality of groups with a varying threshold.

* * * * *